US009046142B2

(12) United States Patent
Kattainen

(10) Patent No.: US 9,046,142 B2

(45) Date of Patent: Jun. 2, 2015

(54) BRAKING APPARATUS

(71) Applicant: KONE Corporation, Helsinki (FI)

(72) Inventor: Ari Kattainen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 60 days.

(21) Appl. No.: 13/866,362

(22) Filed: Apr. 19, 2013

(65) Prior Publication Data

US 2013/0233657 A1 Sep. 12, 2013

Related U.S. Application Data

(63) Continuation of application No. PCT/FI2011/000041, filed on Oct. 13, 2011.

(30) Foreign Application Priority Data

Oct. 21, 2010 (FI) ..................................... 20106092

(51) Int. Cl.

*B60L 7/00* (2006.01)
*F16D 63/00* (2006.01)
*H02P 3/04* (2006.01)
*H02P 15/00* (2006.01)
*F16D 49/00* (2006.01)

(52) U.S. Cl.

CPC ................ *F16D 63/002* (2013.01); *H02P 3/04* (2013.01); *H02P 15/00* (2013.01); *F16D 49/00* (2013.01)

(58) Field of Classification Search

CPC ..... B60T 13/748; B60T 17/221; F16D 40/00; F16D 63/02

USPC ............. 188/67, 156, 164, 171; 187/288, 391

See application file for complete search history.

(56) References Cited

U.S. PATENT DOCUMENTS 3,045,162 A * 7/1962 Wickerham .................. 318/740
3,219,155 A 11/1965 Köhli
3,820,625 A * 6/1974 Balint et al. ................. 187/380
4,545,464 A * 10/1985 Nomura ....................... 187/296

(Continued)

FOREIGN PATENT DOCUMENTS

CN 101479177 A 7/2009
CN 101715426 A 5/2010

(Continued)

*Primary Examiner* — Christopher Schwartz

(74) *Attorney, Agent, or Firm* — Birch, Stewart, Kolasch & Birch, LLP

(57) ABSTRACT

A braking apparatus is provided for braking the rotating part of a hoisting machine. The braking apparatus includes one or more brakes, which contain altogether at least one movable brake shoe, spring elements for activating the brake by moving the brake shoe forward, at least two electromagnets, which, when magnetized by a magnetizing current, apply a force of attraction to bodies conducting magnetic flux. The electromagnets are fitted to release the brake by pulling the brake shoe backwards by resisting the spring elements. The brake is fitted to be activated by reducing the magnetizing current of the electromagnet. The braking apparatus includes a power supply circuit for the electromagnets, which contains controllable power supply interrupting devices. The electromagnets are connected to the power supply circuit in such a way that the supply of magnetizing current to each electromagnet can be interrupted by means of at least two different interrupting devices.

20 Claims, 2 Drawing Sheets

16
11
3
4
9
28
10
7
5
29
8
6
1

(56) References Cited

U.S. PATENT DOCUMENTS

| | | | | |
|---|---|---|---|---|
| 6,237,730 | B1 | 5/2001 | Dropmann et al. | |
| 7,740,110 | B2 * | 6/2010 | Kattainen et al. | 187/288 |
| 8,727,075 | B2 * | 5/2014 | Huppunen et al. | 187/288 |
| 2013/0213745 | A1 * | 8/2013 | Kattainen et al. | 187/288 |
| 2013/0299281 | A1 * | 11/2013 | Lahteenmaki et al. | 187/247 |

FOREIGN PATENT DOCUMENTS

| | | | |
|---|---|---|---|
| GB | 191302418 | A | 0/1914 |
| WO | WO 2009/127772 | A1 | 10/2009 |
| WO | WO 2010/061049 | A1 | 6/2010 |

* cited by examiner

BRAKING APPARATUS

CROSS REFERENCE TO RELATED APPLICATIONS

This application is a Bypass Continuation of PCT International Application No. PCT/FI2011/000041 filed on Oct. 13, 2011, which claims priority under 35 U.S.C §119(a) to Patent Application No. 20106092 filed in Finland on Oct. 21, 2010, all of which are hereby expressly incorporated by reference into the present application.

FIELD OF THE INVENTION

The invention relates to braking apparatus for hoisting machines.

BACKGROUND OF THE INVENTION

The braking device generally used e.g. in an elevator hoisting machine is a machine brake which mechanically engages a rotating part of the hoisting machine. The machine brake may be constructed e.g. as a drum brake or a disc brake. The braking function of the machine brake is activated when the supply of power to the electromagnet of the brake is interrupted e.g. by means of a relay or contactor. The relay/contactor which interrupts the supply of power to the electromagnet of the brake is usually of a type that only remains in the conducting state for as long as power is being supplied to the control terminal of the relay/contactor. Supply of power to the control terminal takes place via the elevator safety circuit and is interrupted when the safety circuit is opened. When the brake is activated, a brake shoe is pressed mechanically against a braking surface to brake the motion of a rotating part of the hoisting machine.

As the machine brake of a hoisting machine usually also functions as a safety device consistent with the requirements of safety regulations, the aim is to design the machine brake/brakes in such a way that the operation of the machine brake/brakes will not cause any danger e.g. due to a failure situation or some other functional irregularity. For example, the braking apparatus of the hoisting machine may comprise two separate brake shoes and in conjunction with these two separate sets of push springs to ensure that the braking power will not be completely lost if one of the brake shoes/push springs fails.

The safety regulations relating to the hoisting function of an elevator have changed because new implementations have become feasible due to the development of technology and, on the other hand, e.g. also because elevators are increasingly being constructed without a machine room. Experts working under the applicant's control are endeavoring to develop the braking apparatuses of hoisting machines by analyzing possible failure situations and improving the functioning of the braking apparatus in different operational situations of the elevator. Some of the issues for further development detected as regards the operating safety of the braking apparatus of a hoisting machine are the following:

- It is important to ensure that the braking power is sufficient to stop the movement of the elevator car in all operational situations, even in a situation where the elevator car is carrying an approx. 25-percent overload while running in the down direction. The problem is that the braking power may gradually diminish e.g. due to dirt, grease or the like having got on a brake shoe or a braking surface of the hoisting machine.

- Especially in elevator systems without machine room, but also in systems with machine room, care has to be taken to ensure that a brake failure—e.g. a fault in an electromagnet, push spring or brake shoe of the brake—will not result in a risk to a serviceman working in the elevator shaft pit or on the top of the elevator car.
- If the brake functions correctly, the braking power will suffice to stop a downwards moving elevator car carrying a 25-percent overload e.g. in an emergency stopping situation. This leads to the consequence that an upwards moving elevator car with full load may stop in an emergency stopping situation with a deceleration rate even dangerously high for the passenger. This deceleration problem is particularly notable in elevator systems without counterweight.
- Reliability of the brake control is equally important for safe operation of the brake as reliability of the operation of the mechanical brake components. A control failure that prevents activation of the brake/brakes is particularly dangerous. Therefore, any failure of the braking apparatus should always take place in a so-called safe failure direction, so that a failure situation always leads to activation of the brake/brakes. It is also necessary to make sure that a short circuit or a similar cross connection in the brake control circuit will not prevent activation of the brake/brakes.

OBJECT OF THE INVENTION

The object of the invention is to improve the safety of the braking apparatus of a hoisting machine by increasing redundancy in the braking apparatus. To achieve this object, a braking apparatus according to claim 1 is disclosed as an invention. Preferred embodiments of the invention are described in the sub-claims.

BRIEF DESCRIPTION OF THE INVENTION

The braking apparatus of the invention comprises one or more brakes, which have in all at least one, most preferably at least two movable brake shoes, spring elements for activating the brake by moving a brake shoe forwards and at least two electromagnets which, when magnetized by a magnetizing current, apply a force of attraction to bodies conducting magnetic flux. The aforesaid electromagnets are fitted to release at least one brake by pulling the aforesaid at least one brake shoe backwards by resisting the aforesaid spring elements. The brake is adapted to be activated by reducing the magnetizing current of at least one of the said electromagnets. The braking apparatus also comprises a power supply circuit for the electromagnets, which contains controllable devices for interruption of power supply. The electromagnets are connected to the power supply circuit in such a way that the supply of magnetizing current to each electromagnet can be interrupted by means of at least two different interrupting devices. The braking apparatus further comprises a brake control unit, which contains at least two control elements. A first one of the control elements is arranged to control a first interrupting device, which can be used to interrupt the supply of magnetizing current to a first electromagnet, and a second one of the control elements is arranged to control a second interrupting device, which can be used to interrupt the supply of magnetizing current to a second electromagnet. The brake control unit is thus arranged to have redundancy with two separate control elements. The rest of the brake control apparatus is also implemented in a way providing redundancy. Fitted in the braking apparatus are at least two electromagnets so that the brake will be activated when the magnetizing current to one of the electromagnets is reduced sufficiently to cause the pulling force of the electromagnet to fall below the pushing force produced by the spring element/spring elements, which is resisted by the electromagnet. The aforesaid control elements of the brake control unit are also connected to the power supply interrupting devices and thus to the power supply of the electromagnets in a redundant manner so that power supply to the first electromagnet can be interrupted by the first control element and power supply to the second electromagnet can be interrupted by the second control element. Therefore, failure of the first or the second control element, and likewise failure of the first or the second interrupting device or failure of the first or the second electromagnet will not prevent activation of the brake, so the braking apparatus of the invention is highly fail-safe.

In a preferred embodiment of the invention, each one of the aforesaid control elements preferably comprises a microprocessor. Said control elements are preferably arranged to monitor the operational condition of each other. The control elements are therefore interconnected in a manner allowing data transfer so as to permit information relating to the operational condition of the control elements, such as messages, check sums, inquiries, and responses to inquiries made by another control element, to be transmitted between the control elements. For this purpose, there may be e.g. a data bus fitted between the control elements. In an embodiment of the invention, the control elements can mutually compare information received from a third element, such as information received from (one or more) sensors measuring the motion of the hoisting machine, information regarding movement of the elevator car received from (one or more) detectors measuring the motion of the elevator car, and/or information received from an elevator safety circuit regarding the state of the elevator safety circuit. Based on the comparison, the first and second control elements can also make an inference about the operational condition of other control elements/elements, independently of said other control elements/elements, and they can also, if necessary, prevent operation of the elevator on the basis of an inference they have made about the operational condition of control elements/elements by interrupting the supply of magnetizing current to the electromagnet of the brake.

The aforesaid controllable power supply interrupting device is preferably either a mechanical controllable switch, such as a relay or contactor, or an electronic switch, such as an igbt transistor, mosfet transistor, bipolar transistor, thyristor, semiconductor relay or equivalent. In an implementation, the first and second power supply interrupting devices are mechanical controllable switches and the third and fourth power supply interrupting devices are electronic switches.

In a preferred embodiment of the invention, the braking apparatus comprises two controllable brakes, each one of which has a brake shoe, a spring element and an electromagnet. In this solution, a first one of the control elements of the brake control unit is arranged to control an interrupting device which can be used to interrupt the supply of magnetizing current to the electromagnet of the first brake and a second one of the control elements of the brake control unit is arranged to control an interrupting device which can be used to interrupt the supply of magnetizing current to the electromagnet of the second brake. Thus, both the brake control and the equipment producing the braking power are implemented in a completely redundant manner, and consequently a single brake fault or a fault in the brake control will not prevent activation of the braking apparatus.

In an implementation with a first brake comprising a first electromagnet and a second brake comprising a second electromagnet, a first interrupting device is fitted to interrupt the magnetizing current to the first electromagnet but not to the second electromagnet and a second interrupting device is fitted to interrupt the magnetizing current to the second electromagnet but not to the first electromagnet. Such a solution enables the supply of current to the electromagnets of different brakes to be interrupted independently of the other brake, and therefore each one of the brakes can also be activated separately. This solution allows the operational condition of each brake to be tested alternately by releasing one of the brakes, applying a force effect to the activated brake and measuring any slipping of the brake. A force effect may result e.g. from the masses of the elevator mechanics as forces of different magnitude are acting on the suspension ropes on opposite sides of the traction sheave of the hoisting machine. A force effect can also be produced driving the elevator motor of the hoisting machine against the brake. This solution also provides the advantage that, in a given emergency stopping situation, such as when an elevator car carrying a full load is moving upwards, the braking power and therefore the deceleration of the elevator car can be limited by first activating only one of the machine brakes and activating the other brake with a delay.

In an implementation of the invention, the power supply circuit comprises a third controllable power supply interrupting device, which is fitted to interrupt the supply of magnetizing current to the first electromagnet but not to the second electromagnet. Of the control elements, the second one is arranged to control the said third power supply interrupting device. In addition, the power supply circuit comprises a fourth controllable power supply interrupting device, which is fitted to interrupt the supply of magnetizing current to the second electromagnet but not to the first electromagnet. Of the control elements, the first one is arranged to control the said fourth power supply interrupting device. Thus, the power supply interrupting equipment is implemented in a redundant manner so that the power supply to the first and second electromagnets can be interrupted independently of each other and, moreover, so that the power supply to each electromagnet is interrupted by means of two separate interrupting devices, while these two separate interrupting devices are controlled via different control elements.

In an implementation, the brake control unit comprises operational modes, at least a mode of normal operation, a failure mode and a braking apparatus condition monitoring mode, and each aforesaid control element is arranged to change its operating program when the operational mode of the brake control unit changes. Each aforesaid control element preferably comprises a microprocessor, and the brake control unit comprises one or more memory storages, in which are stored the software programs to be executed by the aforesaid control elements. When the operating program is changed, program execution in the control element is preferably changed in such manner that the value of a mode variable used to choose the software execution mode changes. In an implementation, in connection with the braking apparatus condition monitoring mode, the first control element is arranged to execute the operating program for supplying magnetizing current to the first electromagnet while the other control element is executing an operating program in which the supply of magnetizing current to the second electromagnet is interrupted. The brake control unit may comprise a non-volatile memory, such as a flash eeprom memory, for storing the aforesaid mode variable; the said non-volatile memory may also be the same memory where the software of the control element/control elements is stored.

The foregoing summary as well as the additional features and advantages of the invention presented below will be better understood from the following description of the embodiments of the invention, which is not to be considered a restriction of the field of application of the invention.

BRIEF DESCRIPTION OF THE FIGURES

In the following, the invention will be described in more detail by way of embodiment examples non-restrictive of the scope of the invention and by referring to the attached drawings, wherein.

DETAILED DESCRIPTION OF PREFERRED EMBODIMENTS OF THE INVENTION

Figure 1:
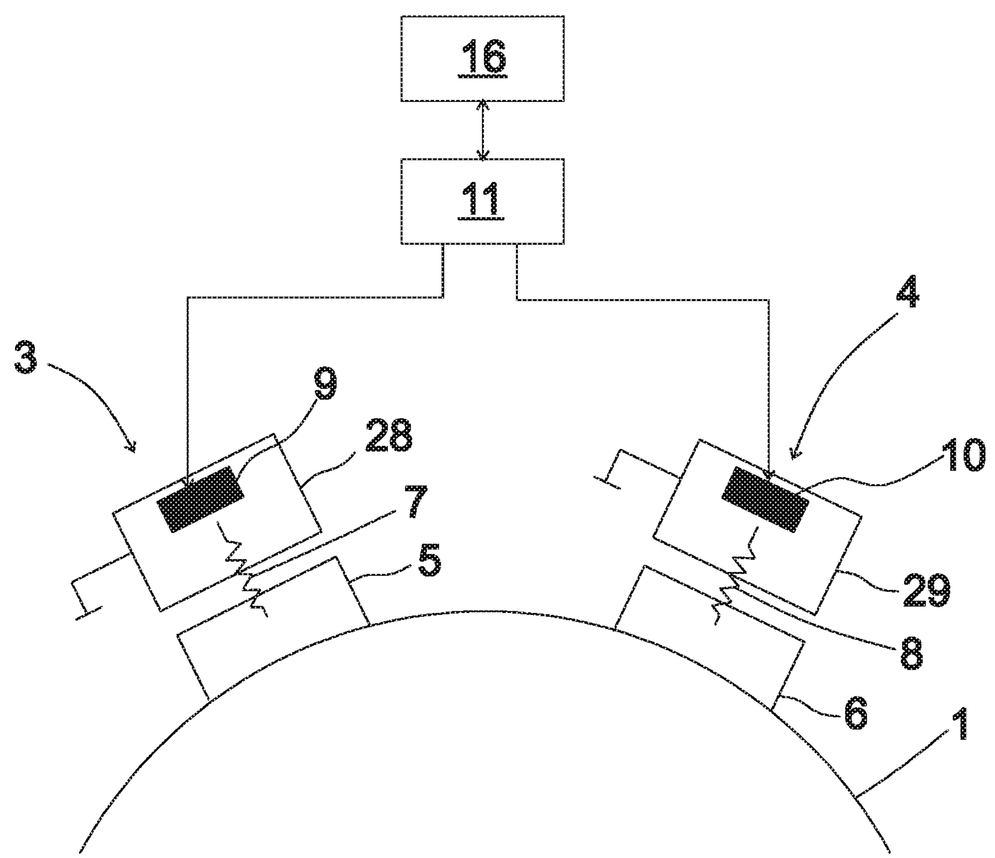
FIG. 1 presents a block diagram representing a braking apparatus according to the invention

FIG. 1 shows a block diagram representing a braking apparatus according to the invention for an elevator hoisting machine. The rotating part 1 of the elevator hoisting machine comprises a traction sheave with rope grooves for the suspension ropes (not shown in FIG. 1) of the elevator car. The force effect produced by the hoisting machine is transmitted via the suspension ropes to the elevator car as a force moving/supporting the elevator car. The braking apparatus of the hoisting machine comprises two separate brakes 3, 4, the frame parts 28, 29 of both brakes being secured to a stationary part 2 of the same hoisting machine. Each brake has a brake shoe 5, 6 movably attached to the stationary part 28, 29 of the brake by means of spring plates 7,8. The spring plates 7, 8 are push springs and they apply to the brake shoe 5, 6 a force that pushes the brake shoe 5, 6 forwards toward the braking surface of rotating part 1 of the hoisting machine. The brake 3, 4 is in an activated state when the pushing force produced by the spring plates 7, 8 is pressing the brake shoe against the braking surface of rotating part 1 of the hoisting machine. The frame part 28, 29 of each brake 3, 4 is provided with an electromagnet 9, 10 which is magnetized by supplying magnetizing current from the power supply circuit 11 to the magnetizing coil of the electromagnet 9, 10. When magnetized by the magnetizing current, the electromagnets 9, 10 generate a force of attraction between the frame part 28, 29 and the brake shoe 5, 6. The force of attraction is proportional to the magnitude of the magnetizing current. Therefore, when the magnetizing current is increased sufficiently, the force of attraction between the frame part and the brake shoe 5, 6 will exceed the pushing force produced by the spring plates 7, 8 and the brake shoe starts moving backwards toward the frame part/electromagnet 9, 10 by resisting the spring plates 7, 8 so that the air gap between the electromagnet 9, 10 and the brake shoe 5, 6 decreases. The brakes 3, 4 are so designed that each one of the brakes is alone capable of sustaining an elevator car carrying a full load or even some overload. The mechanical equipment producing the braking power is implemented in a redundant manner such that a failure of one of the brakes will not in itself lead to an actual danger situation for elevator users or e.g. for a serviceman working in the elevator shaft.

Figure 2A:
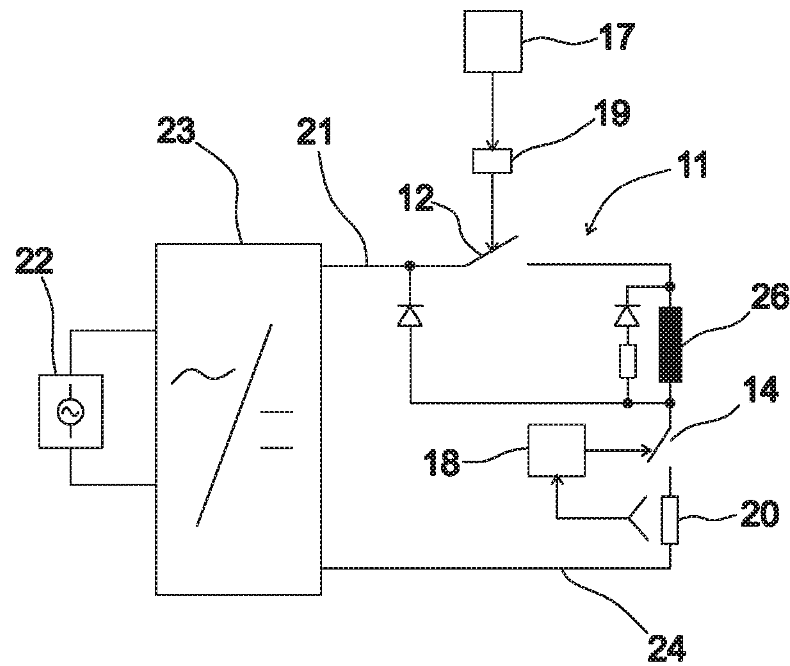
FIGS. 2*a*, 2*b* represent the circuit diagram of an electromagnet power supply circuit according to the invention.
Figure 2B:
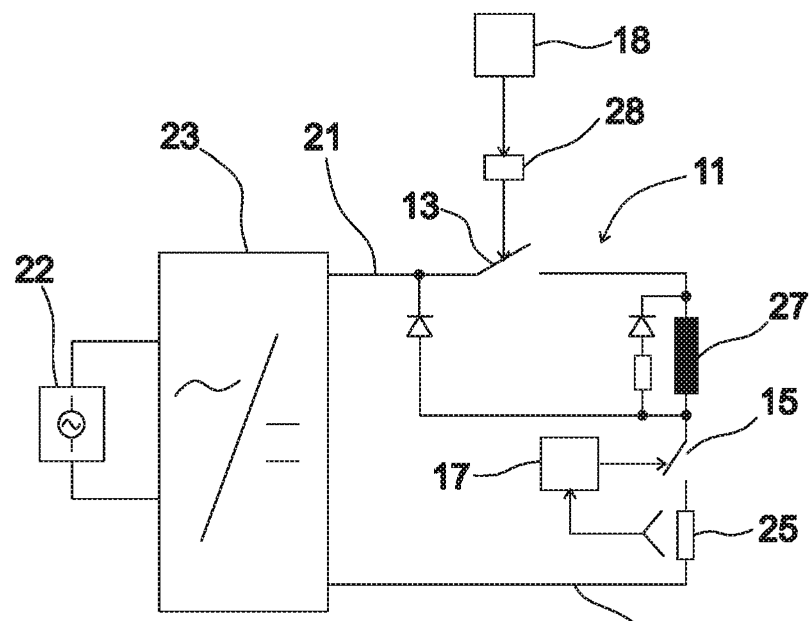

The power supply circuit 11 for the electromagnets 9, 10 contains controllable switches, and the magnetizing coils of the electromagnets 9, 10 are so connected to the power supply circuit 11 that the supply of magnetizing current to each electromagnet 9, 10 can be interrupted by two different switches. The switches are controlled by a brake control unit 16, which comprises two microcontrollers. The control of the switches is arranged to be redundant by using the microcontrollers so that the power supply to each electromagnet 9, 10 can be interrupted by either microcontroller separately. If one of the microcontrollers fails, this still does not prevent interruption of power supply to any one of the electromagnets 9, 10. FIGS. 2*a* and 2*b* show in greater detail the circuit diagram of a power supply circuit 11 applicable for use e.g. in the embodiment in FIG. 1 for the control of two different electromagnets 9, 10. The power supply circuit 11 is divided into two different FIGS. 2*a*, 2*b* in such a way that, for the sake of clarity, each FIG. 2*a*, 2*b* only shows the circuit for a single electromagnet 9, 10. The supply of current to the electromagnets 9, 10 is controlled by the brake control unit 16, which comprises two microcontrollers 17, 18.

The direct-voltage intermediate circuit 21, 24 of the power supply circuit 11 for the electromagnets 9, 10 is supplied with electric power from an alternating-current source 22, such as a transformer secondary with a protective earth connection, via a rectifier bridge 23. FIG. 2*a* presents the circuit diagram of the power supply circuit 11 for the electromagnet 9 of the first brake. A first microcontroller 17 is connected to the control coil 19 of a relay 12. The contactor of the relay 12 is connected between the positive voltage potential 21 of the direct-voltage intermediate circuit and a terminal of the magnetizing coil 26 of the electromagnet 9. The contactor of the relay 12 is opened and the supply of current to the magnetizing coil 26 of the electromagnet 9 is interrupted when the first microcontroller 17 stops supplying current to the control coil 19 of the relay. Correspondingly, the contactor of the relay 12 is closed, allowing current to be supplied to the magnetizing coil 26 of the electromagnet 9, when the first microcontroller 17 starts supplying current to the control coil 19 of the relay. Moreover, the power supply circuit 11 comprises an electronic switch, in this case a mosfet transistor, connected between the other terminal of the magnetizing coil 26 of the electromagnet 9 and the negative voltage potential 24 of the direct-voltage intermediate circuit. A second microcontroller 18 is connected to the gate of the mosfet transistor so that the current of the magnetizing coil 26 of the electromagnet 9 can be regulated by the microcontroller 18. The second microcontroller 18 sends to the gate of the mosfet transistor control signals, preferably control signals implementing pulse width modulation (PWM), on the basis of which the mosfet is switched so that the current in the magnetizing coil 26 of the electromagnet 9 is adjusted towards a desired current reference. The current in the magnetizing coil 26 of the electromagnet 9 is measured by means of a measuring resistor 20.

FIG. 2*b* presents the circuit diagram of the power supply circuit 11 for the electromagnet 10 of the second brake. A second microcontroller 18 is connected to the control coil 28 of a relay 13. The contactor of the relay 13 is connected between the positive voltage potential 21 of the direct-voltage intermediate circuit and a terminal of the magnetizing coil 27 of the electromagnet 10. The contactor of the relay 13 is opened and the supply of current to the magnetizing coil 27 of the electromagnet 10 is interrupted when the second microcontroller 18 stops supplying current to the control coil 28 of the relay. Correspondingly, the contactor of the relay 13 is closed, allowing current to be supplied to the magnetizing coil 27 of the electromagnet 10, when the second microcontroller 18 starts supplying current to the control coil 28 of the relay. Moreover, the power supply circuit 11 comprises an electronic switch 15, in this case a mosfet transistor, connected between the other terminal of the magnetizing coil 27 of the electromagnet 10 and the negative voltage potential 24 of the direct-voltage intermediate circuit. The first microcontroller 17 is connected to the gate of the mosfet transistor so that the current of the magnetizing coil 27 of the electromagnet 10 can be regulated by the first microcontroller 17. The first microcontroller 17 sends to the gate of the mosfet transistor gate control signals, preferably control signals implementing pulse width modulation (PWM), on the basis of which the mosfet 15 is switched so that the current in the magnetizing coil 27 of the electromagnet 10 is adjusted towards a desired current reference. The current in the magnetizing coil 27 of the electromagnet 10 is measured by means of a measuring resistor 25.

By using a power supply circuit consistent with FIGS. 2*a*, 2*b*, the supply of current to the electromagnets 9, 10 of the two brakes 3,4 can be interrupted independently of the other brake, thus also allowing each brake 3, 4 to be activated separately. This solution also makes it possible to test the operational condition of each brake 3, 4 alternately by releasing one of the brakes 3, 4 and measuring the slip of the activated brake.

In an embodiment of the invention, the magnetizing coils 26, 27 of the electromagnets 9, 10 are connected mutually in parallel. In this case, the power supply circuit 11 is simplified, comprising either only the elements according to FIG. 2*a* or only the elements according to FIG. 2*b*. However, in this embodiment the brakes 3, 4 can not be controlled independently of each other, nor can the brakes 3, 4 be e.g. released or activated separately.

It is obvious to a person skilled in the art that different embodiments of the invention are not exclusively restricted to the examples described in the foregoing but can be varied within the scope of the claims presented below.

It is likewise obvious to a person skilled in the art that the braking apparatus of the invention can be used in an elevator system with counterweight as well as in an elevator system without counterweight.

It is further obvious to a person skilled in the art that the invention is applicable both to drum brakes and to disc brakes.

The invention claimed is:

1. A braking apparatus for braking a rotating part of a hoisting machine, said braking apparatus comprising:

one or more brakes comprising:

at least one movable brake shoe;

spring elements for activating the brake by moving the brake shoe forwards; and at least two electromagnets, which, when magnetized by a magnetizing current, apply a force of attraction to bodies conducting magnetic flux, wherein the at least two electromagnets are fitted to release the one or more brakes by pulling the at least one movable brake shoe backwards by resisting the spring elements, and the brake is fitted to be activated by reducing the magnetizing current of the electromagnet;

a power supply circuit for the electromagnets, said power supply circuit containing controllable power supply interrupting devices;

the at least two electromagnets being connected to said power supply circuit in such a way that the supply of magnetizing current to each electromagnet can be interrupted by means of at least two different interrupting devices;

a brake control unit, which contains at least two control elements; and a first one of said control elements being arranged to control a first interrupting device, which can be used to interrupt the supply of magnetizing current to a first electromagnet, while a second one of said control elements is arranged to control a second interrupting device, which can be used to interrupt the supply of magnetizing current to a second electromagnet.

2. The braking apparatus according to claim 1, wherein the braking apparatus comprises two controllable brakes, each of which includes:

a brake shoe a spring element an electromagnet and wherein a first one of the control elements of the brake control unit is arranged to control an interrupting device which can be used to interrupt the supply of magnetizing current to the electromagnet of the first brake; and wherein a second one of the control elements of the brake control unit is arranged to control an interrupting device which can be used to interrupt the supply of magnetizing current to the electromagnet of the second brake.

3. The braking apparatus according to claim 2, wherein the first brake comprises the first electromagnet and the second brake comprises the second electromagnet.

4. The braking apparatus according to claim 3, wherein the first interrupting device is arranged to interrupt the magnetizing current to the first electromagnet but not to the second electromagnet.

5. The braking apparatus according to claim 3, wherein the second interrupting device is arranged to interrupt the magnetizing current to the second electromagnet but not to the first electromagnet.

6. The braking apparatus according to claim 2, wherein the second interrupting device is arranged to interrupt the magnetizing current to the second electromagnet but not to the first electromagnet.

7. The braking apparatus according to claim 2, wherein the first interrupting device is arranged to interrupt the magnetizing current to the first electromagnet but not to the second electromagnet.

8. The braking apparatus according to claim 1, wherein the control element is arranged to determine the operational condition of the other control element.

9. The braking apparatus according to claim 8, wherein the control element is arranged to monitor the operational condition of the other control element.

10. The braking apparatus according to 8, wherein the control element is arranged to control the interrupting device on the basis of the operational condition of the other control element.

11. The braking apparatus according to any claim 1, wherein the brake control unit comprises operational modes, at least a mode of normal operation, a failure mode, an emergency stopping mode and a braking apparatus condition monitoring mode; and wherein each control element is arranged to change its operating program when the operational mode of the brake control unit changes.

12. The braking apparatus according to claim 11, wherein, in connection with the braking apparatus condition monitoring mode, both the first and the second control element is arranged to execute an operational program wherein the supply of magnetizing current to the second electromagnet is interrupted while at the same time magnetizing current is being supplied to the first electromagnet.

13. The braking apparatus according to claim 1, wherein the first interrupting device is arranged to interrupt the magnetizing current to the first electromagnet but not to the second electromagnet.

14. The braking apparatus according to claim 13, wherein the second interrupting device is arranged to interrupt the magnetizing current to the second electromagnet but not to the first electromagnet.

15. The braking apparatus according to claim 1, wherein the second interrupting device is arranged to interrupt the magnetizing current to the second electromagnet but not to the first electromagnet.

16. The braking apparatus according to any claim 1, wherein the power supply circuit comprises a third controllable power supply interrupting device, which is fitted to interrupt the supply of magnetizing current to the first electromagnet but not to the second electromagnet;

and wherein the second one of the control elements is arranged to control the said third power supply interrupting device.

17. The braking apparatus according to any claim 1, wherein the power supply circuit comprises a fourth controllable power supply interrupting device, which is fitted to interrupt the supply of magnetizing current to the second electromagnet but not to the first electromagnet; and wherein the first one of the control elements is arranged to control the said fourth power supply interrupting device.

18. The braking apparatus according to any claim 1, wherein each control element comprises a microprocessor.

19. The braking apparatus according to claim 1, wherein the power supply interrupting device comprises an input for a control signal;

wherein the power supply interrupting device is arranged to supply magnetizing current into the electromagnet on the basis of a first control signal; and wherein the power supply interrupting device is arranged to interrupt the supply of magnetizing current on the basis of a second control signal differing from the first control signal.

20. The braking apparatus according to claim 1, wherein the current supply circuit comprises means for measuring the magnetizing current of each electromagnet;

wherein the second control element is fitted to measure the magnetizing current of the first electromagnet; and wherein the first control element is fitted to measure the magnetizing current of the second electromagnet.

* * * * *